(12) United States Patent
Lehtiniemi et al.

(10) Patent No.: US 9,576,387 B2
(45) Date of Patent: Feb. 21, 2017

(54) CREATING A CINEMAGRAPH

(71) Applicant: NOKIA CORPORATION, Espoo (FI)

(72) Inventors: Arto Juhani Lehtiniemi, Lempaala (FI); Lasse Juhani Laaksonen, Nokia (FI); Miikka Tapani Vilermo, Siuro (FI); Mikko Tapio Tammi, Tampere (FI)

(73) Assignee: Nokia Corporation, Espoo (FI)

( * ) Notice: Subject to any disclaimer, the term of this patent is extended or adjusted under 35 U.S.C. 154(b) by 142 days.

(21) Appl. No.: 14/490,437

(22) Filed: Sep. 18, 2014

(65) Prior Publication Data

US 2015/0077421 A1 Mar. 19, 2015

(30) Foreign Application Priority Data

Sep. 18, 2013 (EP) ..................................... 13184956

(51) Int. Cl.
*G06T 13/80* (2011.01)
*H04N 1/387* (2006.01)
*G06T 13/20* (2011.01)
(52) U.S. Cl.
CPC .............. *G06T 13/80* (2013.01); *G06T 13/20* (2013.01); *H04N 1/387* (2013.01)
(58) Field of Classification Search
None
See application file for complete search history.

(56) References Cited

U.S. PATENT DOCUMENTS

| 8,957,915 | B1* | 2/2015 | Chalasani | G09G 5/377 345/473 |
| 2003/0222888 | A1 | 12/2003 | Epshteyn | |
| 2005/0225566 | A1* | 10/2005 | Kojo | G06T 13/80 345/629 |
| 2007/0294619 | A1* | 12/2007 | Krishnaswamy | G06F 17/211 715/704 |
| 2011/0025830 | A1 | 2/2011 | McNamer et al. | |
| 2011/0249095 | A1 | 10/2011 | Kim et al. | |
| 2012/0075415 | A1* | 3/2012 | Kim | G06T 3/4038 348/36 |

(Continued)

FOREIGN PATENT DOCUMENTS

| WO | 2013/079774 A1 | 6/2013 |
| WO | WO-2014/108755 A1 | 7/2014 |
| WO | WO-2014/188235 A1 | 11/2014 |

OTHER PUBLICATIONS

Tompkin, James, et al. "Towards moment imagery: Automatic cinemagraphs." Visual Media Production (CVMP), 2011 Conference for. IEEE, 2011.*

(Continued)

*Primary Examiner* — Abderrahim Merouan
*Assistant Examiner* — Nurun N Flora
(74) *Attorney, Agent, or Firm* — Alston & Bird LLP

(57) ABSTRACT

An apparatus receives first image data that is based on image data captured by a first camera and second image data that is based on image data captured by a second camera. The apparatus then creates a cinemagraph using the first image data for a static part of the cinemagraph and using the second image data for an animated part of the cinemagraph. Another apparatus could provide at least one of the first and second image data based on a detected corresponding element.

20 Claims, 9 Drawing Sheets

(56) References Cited

U.S. PATENT DOCUMENTS

| | | | | |
|---|---|---|---|---|
| 2012/0207386 A1* | 8/2012 | Ofek | ............... | G11B 27/00 |
| | | | | 382/168 |
| 2014/0046976 A1* | 2/2014 | Zhang | ............... | G06F 17/30483 |
| | | | | 707/772 |
| 2014/0347370 A1* | 11/2014 | Yamano | ............... | G06T 7/2006 |
| | | | | 345/473 |

OTHER PUBLICATIONS

Yeh, Mei-Chen, and Po-Yi Li. "An approach to automatic creation of cinemagraphs." Proceedings of the 20th ACM international conference on Multimedia. ACM, 2012.*

Liao, Zicheng, Neel Joshi, and Hugues Hoppe. "Automated video looping with progressive dynamism." ACM Transactions on Graphics (TOG) 32.4 (2013): 77.*

Pertilä, P. et al., *Passive Self-Localization of Microphones Using Ambient Sounds*, European Signal Processing Conference, EUSIPCO (Aug. 27-31, 2012) 1314-1318.

Extended European Search Report received in European Application No. 13184956.4, dated Mar. 17, 2014, 7 pages.

Tompkin, James, et al., "Towards Moment Imagery: Automatic Cinemagraphs," IEEE 2011 Conference for Visual Media Production, Nov. 16, 2011, pp. 87-93.

\* cited by examiner

CREATING A CINEMAGRAPH

RELATED APPLICATION

This application claims priority to European Application No. 13184956.4 filed Sep. 18, 2013, which is incorporated herein by reference in its entirety.

FIELD OF THE DISCLOSURE

The invention relates to the field of cinemagraphs and more specifically to the creation of a cinemagraph.

BACKGROUND

Cinemagraphs constitute a mixture between a photograph and a video. They provide the illusion that a viewer is watching a still image that contains some movement or alternatively a video that contains many static elements. The selection of the moving and static elements is typically made such that the cinemagraph provides a surprise for the viewer or that it enhances the mood of the images. Cinemagraphs are well suited for creating short motion sequences to make the still images more life-like and interesting or to draw the attention of the viewer to a particular aspect of the image.

Cinemagraphs can be created manually based on a sequence of captured pictures using a dedicated application. The sequence of pictures can be either a sequence of photographs or a sequence of images represented by video frames. Cinemagraphs can also be created automatically.

For creating a cinemagraph, desired moving elements may be selected from the sequence of pictures. One of the pictures may be selected for the still parts of the cinemagraph, and the moving elements may be filtered out from this picture. The animation for these elements may be created based on a plurality of the pictures. The animation can be provided as a sequence of frames that is repeated in a loop. The plurality of the pictures that form the basis for the animation may be selected for example such that the result appears as a seamless loop of a movement.

SUMMARY OF SOME EMBODIMENTS OF THE INVENTION

A method for a first aspect is described which comprises at an apparatus receiving first image data that is based on image data captured by a first camera and receiving second image data that is based on image data captured by a second camera. The method further comprises creating a cinemagraph using the first image data for a static part of the cinemagraph and using the second image data for an animated part of the cinemagraph.

A method for a second aspect is described, which comprises at an apparatus receiving image data captured by a first camera and receiving image data captured by a second camera. The method further comprises comparing the received image data captured by the first camera and the received image data captured by the second camera to determine corresponding elements represented by the received image data captured by the first camera and the received image data captured by the second camera. The method further comprises providing an indication for transmission to a device in the case of a determined corresponding element, the indication enabling the device to highlight the element in a presentation of first image data that is based on image data captured by the first camera. The method further comprises receiving from the device a request for second image data that is based on image data captured by the second camera. The method further comprises providing the second image data for transmission to the device to enable the device to create a cinemagraph using the first image data and the second image data.

Moreover a first apparatus is described for each aspect, which comprises means for realizing the actions of the method presented for the first aspect or the method presented for the second aspect, respectively.

The means of the apparatus can be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means.

Moreover a second apparatus is described for each aspect, which comprises at least one processor and at least one memory including computer program code, the at least one memory and the computer program code configured to, with the at least one processor, cause at least one apparatus at least to perform the actions of the method presented for the first aspect or the method presented for the second aspect, respectively.

An apparatus for the first aspect could thus comprise at least one processor and at least one memory including computer program code, the at least one memory and the computer program code configured to, with the at least one processor, cause at least one apparatus at least to perform: receive first image data that is based on image data captured by a first camera; receive second image data that is based on image data captured by a second camera; and create a cinemagraph using the first image data for a static part of the cinemagraph and using the second image data for an animated part of the cinemagraph.

An apparatus for the second aspect could thus comprise at least one processor and at least one memory including computer program code, the at least one memory and the computer program code configured to, with the at least one processor, cause at least one apparatus at least to perform: receive image data captured by a first camera; receive image data captured by a second camera; compare the received image data captured by the first camera and the received image data captured by the second camera to determine corresponding elements represented by the received image data captured by the first camera and the received image data captured by the second camera; provide an indication for transmission to a device in the case of a determined corresponding element, the indication enabling the device to highlight the element in a presentation of first image data that is based on image data captured by the first camera; receive from the device a request for second image data that is based on image data captured by the second camera; and provide the second image data for transmission to the device to enable the device to create a cinemagraph using the first image data and the second image data.

Any of the described apparatuses may be a module or a component for a device, for example a chip. Alternatively, any of the mentioned apparatuses may be a mobile or stationary device.

Any of the described apparatuses may further comprise only the indicated components or one or more additional components.

In certain embodiments, the described methods are information providing methods, and the described apparatuses are information providing apparatuses.

In certain embodiments of the described methods, the method according to the first aspect is a method for creating cinemagraphs and the method according to the second aspects is a method for supporting a creation of cinemagraphs. In certain embodiments of the described apparatuses, the apparatuses according to the first aspect are apparatuses for creating cinemagraphs and the apparatuses according to the second aspect are apparatuses for supporting a creation of cinemagraphs.

Moreover, a system is described, which comprises any of the presented apparatuses as a first device and at least one other device, for example a device comprising a camera. The system could also comprise at least two apparatuses according to the first aspect, or at least one apparatus according to the first aspect and at least one apparatus according to the second aspect.

Moreover a non-transitory computer readable storage medium is described for each aspect, in which computer program code is stored. The computer program code causes at least one apparatus to perform the actions of the method presented for the first aspect or the method presented for the second aspect, respectively.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the respective computer program code by itself has to be considered an embodiment of the invention. The computer program code could also be distributed to several computer readable storage mediums.

It is to be understood that the presentation of the invention in this section is merely by way of example and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
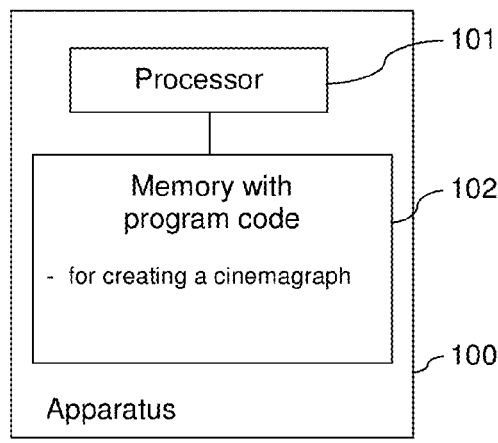
FIG. 1 is a schematic block diagram of an example embodiment of an apparatus.

FIG. 1 is a schematic block diagram of an example embodiment of any apparatus according to the first aspect of the invention. Apparatus 100 comprises a processor 101 and, linked to processor 101, a memory 102. Memory 102 stores computer program code for creating a cinemagraph. Processor 101 is configured to execute computer program code stored in memory 102 in order to cause an apparatus to perform desired actions. Memory 102 is thus an example embodiment of a non-transitory computer readable storage medium, in which computer program code according to the first aspect of the invention is stored.

Apparatus 100 could be a mobile device, like a camera, a device comprising a camera, a mobile terminal, a mobile computing device or a laptop, but it could also be a stationary device like a personal computer (PC) or a server. Apparatus 100 could equally be a component, like a chip, circuitry on a chip or a plug-in board, for any device. Optionally, apparatus 100 could comprise various other components, like a camera, a data interface configured to enable an exchange of data with other apparatuses, a user interface like a touchscreen, a further memory, a further processor, etc.

An operation of an apparatus will now be described with reference to the flow chart of FIG. 2. The operation is an example embodiment of a method according to the first aspect of the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus receives first image data that is based on image data captured by a first camera. (action 201)

The apparatus furthermore receives second image data that is based on image data captured by a second camera. (action 202)

The apparatus furthermore creates a cinemagraph using the first image data for a static part of the cinemagraph and using the second image data for an animated part of the cinemagraph. (action 203)

Certain embodiments of the first aspect of the invention thus provide that image data captured by two or more cameras may be combined when creating a cinemagraph. The captured image data could be image data of photographs or image data of video frames. The image data that is captured by a single camera at a single point of time will also be referred to as picture or frame in this document, regardless of the type of camera that captured the image data. The first image data could correspond to image data of at least one picture or frame, or to an excerpt of at least one picture or frame. It could be image data as captured by a camera or processed captured image data. The same applies for the second image data.

Certain embodiments of the invention may have the effect that they enable a collaborative creation of cinemagraphs by several users or at least a contribution to cinemagraphs by several users. Certain embodiments of the invention may have the effect that they enable a creation of cinemagraphs based on image data captured by several devices that are used or controlled by a single user. Certain embodiments of the invention may have the effect that limits to the creativity of users are reduced. Certain embodiments of the invention may have the effect that a multi-viewpoint usage is enabled.

Figure 2:
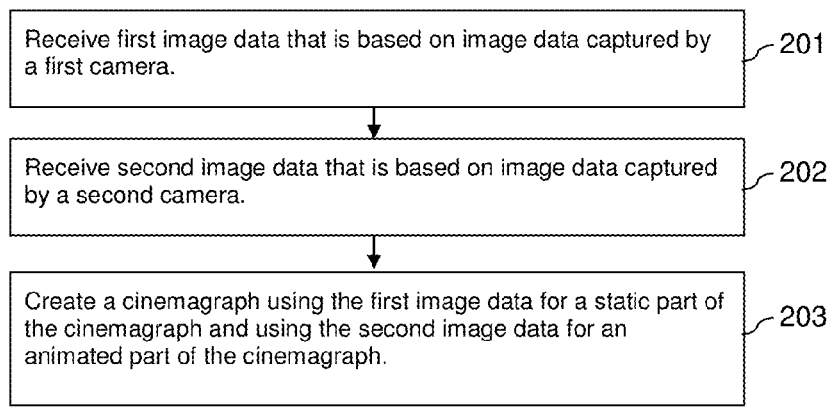
FIG. 2 is a flow chart illustrating an example embodiment of a method.

Apparatus 100 illustrated in FIG. 1 and the method illustrated in FIG. 2 may be implemented and refined in various ways.

In an example embodiment, the received first image data and the received second image data are selected for creating the cinemagraph based at least on computed relative positions and/or computed relative orientations of the first camera and the second camera. This may have the effect that it can be ensured that the same scene is represented by the first and second image data, just with different views. Knowledge about relative positions can be obtained in various ways. Relative positions could be obtained for example by analyzing captured audio data. An approach for determining relative positions using a multi-microphone techniques has been presented for example by P. Pertilä, M. Mieskolainen and M. Hämäläinen in the document "Passive Self-Localization of Microphones Using Ambient Sounds", EUSIPCO, Bucharest, Romania, Aug. 27-31, 2012. Another approach for determining relative positions could use a different technique or a combination of techniques, including for example a wireless local area network (WLAN) based positioning and/or a differential global positioning system (DGPS) based positioning. Relative orientations of cameras could be obtained for instance by means of digital compass information, etc.

In an example embodiment, the received first image data and the received second image data are selected for creating the cinemagraph at least based on a user input. The user input could include a selection of image data, or it could contribute to determining relative positions and/or orientations of devices, which may be used in turn for selecting the image data.

In an example embodiment, the image data that is used for creating the cinemagraph is aligned. The term alignment is to be understood such that it may not only comprise a relative shifting of image data but that it could also comprise a scaling and/or any other kind of image transformation that aims at harmonizing characteristics of different sets of image data. Such transformations are also referred to as image rectification.

In the case image data captured by different cameras at different angles and/or at different distances are to be combined in a cinemagraph, elements represented by the image data might be scaled to the same size in order to avoid mismatching proportions of elements represented in the cinemagraph.

The performed alignment could be matched to a respective use case. The size of captured elements in a picture sequence may vary if the elements and/or the camera capturing the picture sequence are moving. In case the animated part is generated with image data that is based on image data captured by a single camera, namely the second camera, it may be desired that this change of size is reflected in the cinemagraph. In this case, it might be sufficient to perform a single scaling operation by scaling only image data that is to be used for the static part and that is based on image data captured by the first camera. However, it would also be possible to scale the size of an element of an animated part that is based on image data captured by the second camera continuously, for example relative to image data of a single picture captured by a first camera. In case the image data that is used for creating the animated part is based on image data captured by several cameras, the image data could be scaled continuously using a single set of image data as a reference. However, also in this case, it may be desired to reflect changes in size of a particular element when the element is moving. In an example embodiment, the image data that is based on image data captured by different cameras could thus be scaled to a matching size at each time instance that is to be reflected in the cinemagraph. In an example embodiment, the "same size" could be determined with overlapping portions of a picture sequence, based on time. It is to be understood that many other configurations of an alignment could be used as well, depending on desired effects.

In a first approach, creating the cinemagraph comprises aligning the received first image data and the received second image data. In a second approach, the first image data and the second image data are already received in an aligned form. The first approach may have the effect that there is no need to make use of an external service. The second approach may have the effect that processing power at the apparatus is saved. Image data could be received in aligned form for example from a device that captured the image data, on which the received image data is based. In this case, the alignment could be performed at the device upon a request of the apparatus creating the cinemagraph. Alternatively, image data could be received in aligned form for example from a server that receives image data from several cameras.

While it is assumed that the first image data is used for generating a static part of the cinemagraph and that the second image data is used for generating an animated part of the cinemagraph, it is to be understood that the first image data could optionally be used in addition for generating the animated part or for generating another animated part of the cinemagraph, and that the second image data could optionally be used in addition for generating another static part of the cinemagraph. It is also to be understood that additional image data that is based on image data captured by further cameras could contribute to static or animated parts of the cinemagraph.

An example embodiment comprises enabling a user to select image data that is to be used for a static part when creating the cinemagraph and image data that is to be used for an animated part of the cinemagraph when creating the cinemagraph. Alternatively or in addition, a user could be enabled to select the first image data and further image data that are to be used in sequence for a static part of the cinemagraph when creating the cinemagraph. That is, the static part of the cinemagraph may change. Alternatively or in addition, a user could be enabled to select the second image data and further image data that are to be used in sequence for an animated part of the cinemagraph when creating the cinemagraph. That is, the animated part of the cinemagraph may change. The respective further image data may be based on image data captured by the first camera, the second camera or another camera. Each of these embodiments may have the effect that the user has a considerable flexibility in creating the cinemagraph.

In an example embodiment, creating the cinemagraph comprises creating as an animated part a rotating three-dimensional element. This may have the effect that an animated part may be particularly highlighted during a presentation. A rotating three-dimensional element may be based on image data captured by different cameras with different views. The image data that is used for creating a rotating three-dimensional element could thus comprise for example the second image data and the first image data and/or image data that is based on image data captured by at least one further camera. The rotation may be realized such that it is experienced by a viewer of the cinemagraph as a step-wise rotation or as a continuous rotation. The latter may have the effect that the motion in the cinemagraph appears smoother and that the impression of a three-dimensional presentation of the element becomes stronger. The image data that is used for the rotating element may be of the same point in time or of subsequent points in time. It has to be noted that the rotation does not have to be a rotation by 360°; it has further to be noted that the axis of rotation could be changed during the cinemagraph.

In order to create a smoothly rotating three-dimensional element based on image data from a limited number of views, data for a presentation of the element as conceived in between these views has to be created.

In an example embodiment, creating a rotating three-dimensional element comprises using a disparity map. The disparity between two images may be computed as a shift to the left of an image feature in a left image corresponding to said feature in a right image. A presentation of a rotating element could basically be realized as a sequence of left and right images of a three dimensional image from more than one viewpoint. Each viewpoint could thus be separately generated. Alternatively or in addition, creating a three-dimensional element may comprise using a depth map. A depth map cap could be created using focus scanning as described in US patent application 2011/0025830 A1. In focus scanning, a camera focuses at different depths and computes the depth map from several images. When two closely spaced cameras are recording the same scene, one of the cameras could acquire for example a depth map with focus scanning and the acquired depth map could be used along with image data captured by the other camera.

In an example embodiment, creating the cinemagraph comprises enabling a user to cause a switching in the cinemagraph between a presentation of an element as a static part and as an animated part of the cinemagraph. Alternatively or in addition, creating the cinemagraph may comprise enabling a user to cause a switching in the cinemagraph between a presentation of an element as a two-dimensional animated part and as a three-dimensional rotating part of the cinemagraph. Both may have the effect that an element may be particularly highlighted in the user interface.

In an example embodiment, the apparatus presents the received first image data to a user, before the second image data is received and the cinemagraph is created. In this embodiment, the apparatus further receives an indication that second image data for an element in the received first image data is available, highlights an element in the presented first image data for which second image data is available, requests the second image data upon a user input, and receives the second image data in response to the request. This may have the effect that the creation is rendered particularly comfortable to a user. This example embodiment may be considered complementary to the presented second aspect of the invention.

In an example implementation of this example embodiment, the received second image data is based on a subset of image data captured by the second camera, the subset being selected based on the indication of the element and/or a user selection of an element. This may have the effect that the bandwidth required for transferring the second image data can be reduced.

In an example embodiment, the first image data and/or the second image data is received at the apparatus according to the first aspect from a server. The first image data or the second image data could also be received directly from a device comprising the apparatus and one of the cameras. The first image data and/or the second image data could also be received directly from a respective device comprising one of the cameras but not the apparatus.

In an example embodiment, data representing the created cinemagraph may be assembled in a file. The file may be provided for a presentation of the cinemagraph on a screen and/or for storage in a memory and/or for transmission to another apparatus.

Certain embodiments of the second aspect of the invention provide that an apparatus supports the creation of a cinemagraph at a device. The apparatus could, for instance, be or belong to a server that has access to image data captured by various cameras. The apparatus may determine whether image data captured by different cameras represent a same element. If this is the case, the element may be indicated to the device. As a result, the device may highlight the element in a presentation that is based on image data captured by a first camera and request from the apparatus image data that is based on image data captured by a second camera, possibly upon a user input at the device. Optionally but not necessarily, the first camera could be a part of the device. The apparatus could provide the requested image data to the device to enable the device to create a cinemagraph based on image data captured by at least two cameras.

Certain embodiments of the second aspect may have the effect that the creation of a cinemagraph that is based on image data captured by a plurality of cameras is supported. Certain embodiments of the second aspect may moreover have the effect that the creation of such a cinemagraph is rendered particularly comfortable to a user.

In an example embodiment of the second aspect, the image data captured by the first camera is received with information on at least one of a position and an orientation of the first camera, the image data captured by the second camera is received with information on at least one of a position and an orientation of the second camera. Comparing the received image data captured by the first camera and the received image data captured by the second camera may then comprise selecting parts of the received image data for the comparison based on the information. Alternatively or in addition, the image data captured by the second camera may comprise a sequence of frames, and providing the second image data to a device may comprise selecting frames including image data for the corresponding element and providing only image data that is based on the selected frames as the second image data to the device. Alternatively or in addition, the image data captured by the second camera may comprise a sequence of frames, and providing the second image data to a device may comprise selecting excerpts of frames including image data for the corresponding element and providing only image data that is based on the selected excerpts as the second image data to the device. These embodiments may have the effect that the bandwidth required for transferring the image data can be reduced.

Figure 3:
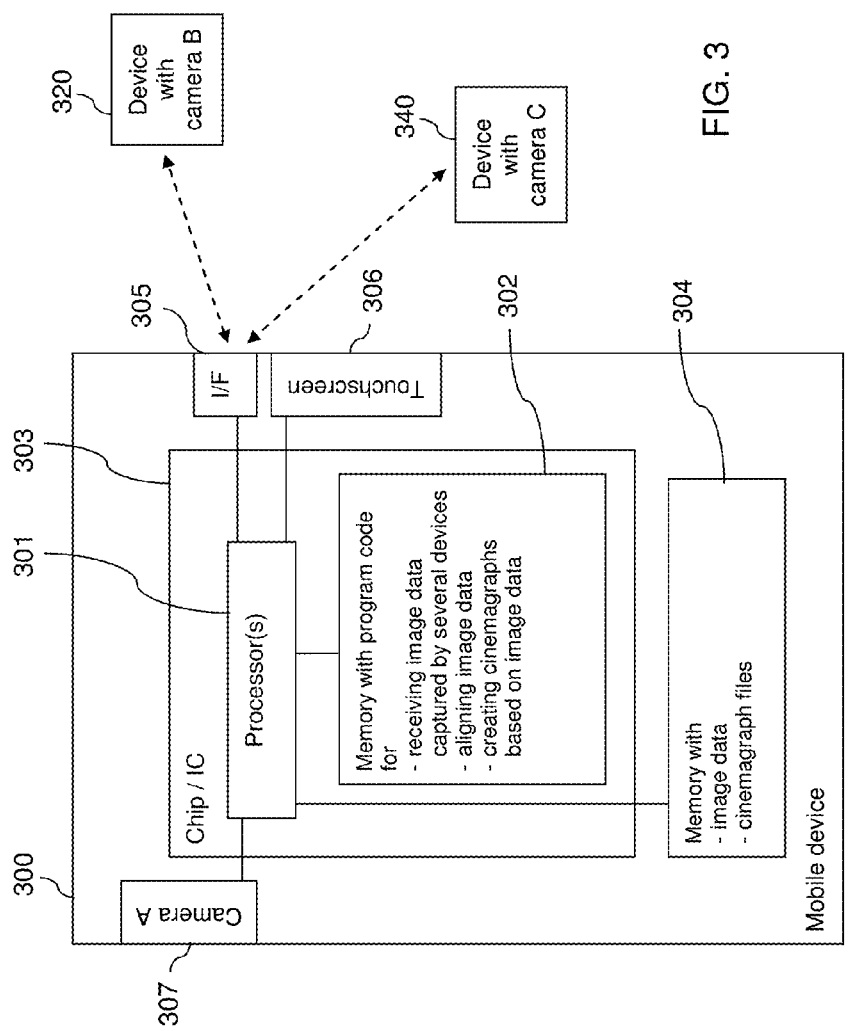
FIG. 3 is a schematic block diagram of an example embodiment of a system.

FIG. 3 is a schematic block diagram of an example system enabling a collaborative creation of cinemagraphs. It comprises a first mobile device 300, a second mobile device 320 and a third mobile device 340.

Mobile device 300 could be for example a camera, a mobile phone like a smartphone, some other mobile terminal, such as a tablet computer, or a laptop, etc. It comprises a processor 301 that is linked to a first memory 302, to a second memory 304, to a data interface I/F 305, to a touchscreen 306 and to a camera 'A' 307.

Processor 301 is configured to execute computer program code, including computer program code stored in memory 302, in order to cause mobile device 300 to perform desired actions. It is to be understood that processor 301 may comprise or be connected to a random access memory as a working memory for supporting its operation.

Memory 302 stores computer program code for creating cinemagraphs based on image data captured by several devices. The computer program code may be an example embodiment of the computer program code according to the first aspect of the invention. In addition, memory 302 may store computer program code implemented to realize other functions, for example computer program code for supporting a collaborative creation of cinemagraphs at other devices, as well as any kind of other data.

Processor 301 and memory 302 may optionally belong to a chip or an integrated circuit 303, which may comprise in addition various other components, for instance a further processor or memory.

Memory 304 can equally be accessed by processor 301. It is configured to store any kind of data, for instance image data captured by camera 307, image data captured by cameras of other devices and data of created cinemagraphs. It could be an integrated part of mobile device 300 or a removable part of mobile device 300, like a memory card. It could also be external to mobile device 300.

Data interface 305 can be any kind of interface that enables a direct or indirect exchange of data with other devices. It could include for instance a cellular communications transceiver, a WLAN transceiver, a Bluetooth transceiver, a near field communication (NFC) transceiver, or a slot for a memory card.

Touchscreen 306 is an example of a user interface. It is to be understood that functions corresponding to those of touchscreen 306 could also be provided, for example, by means of a display that is not touch sensitive and some separate input means, like keys.

Camera 307 is a digital camera. It could be a photographic camera or a video camera or support functions of both.

Mobile device 300 could comprise various other components, like a GPS receiver.

Component 303 or mobile device 300 could correspond to example embodiments of any apparatus according to the first aspect of the invention.

Mobile devices 320 and 340 could be similar to mobile device 300. However, they do not necessarily have to comprise program code for creating cinemagraphs based on image data captured by several devices. In any case, mobile device 320 comprises a camera B and means for providing image data captured by camera B to mobile device 300; and mobile device 340 comprises a camera C and means for providing image data captured by camera C to mobile device 300. Providing captured image data to mobile device 300 could also be achieved indirectly. The image data could be transmitted for example to a server for storage, and mobile device 300 could then retrieve the data from the storage by accessing the server. The image data captured by one of the devices 320, 340 could also be stored on a memory card and transferred on the memory card to mobile device 300 or to a further device, which then takes care that mobile device 300 is able to access the image data.

Example operations in the system of FIG. 3 will now be described with reference to FIG. 4. Processor 301 and some of the program code stored in memory 302 cause mobile device 300 to perform the operations presented on the left hand side of FIG. 4, when the program code is retrieved from memory 302 and executed by processor 301. These operations could represent an example embodiment of a method according to the first aspect of the invention. Any presented data exchange of device 300 with other devices may be performed via data interface 305. Operations of cameras A, B and C of devices 300, 320 and 340, respectively, are presented on the right hand side of FIG. 4.

Users of mobile devices 300, 320 and 340 may decide to create a collaborative cinemagraph at mobile device 300. Upon a user input at device 300, camera A 305 captures a picture sequence of a scene. (action 401) Upon a user input at device 320, camera B captures a picture sequence of the same scene and sends the image data to device 300. (action 402) Upon a user input at device 340, camera C captures a picture sequence of the same scene and sends the image data to device 300. (action 403)

Processor 301 of mobile device 300 receives the image data of the picture sequences of cameras A, B, C. (action 411) The image data could be stored in memory 304 and/or in a working memory.

Device 300 segments the pictures and detects motion from picture to picture in each segment separately for each picture sequence. (action 412) Elements that are found to be suitable for animation are selected in the pictures separately for each picture sequence. The selection may be performed in a conventional manner. For example, those segments may be selected automatically, which comprise the largest amount of motion or a motion exceeding a predetermined absolute or relative threshold value. It is to be understood that in an alternative embodiment, the user could be enabled to evaluate the motion and select elements manually.

Next, the picture sequences are presented to the user on touchscreen 306 such that the user may flip through the different views. Each view corresponds to the picture sequence captured by one of the cameras A, B, C. Within each view, the user may leaf through the pictures. (action 413) The elements for which motion has been detected may be highlighted, for instance by coloring. When a user flips from a picture of one view to a picture of another view, it could be taken care that the pictures are pictures captured at substantially the same time. This could be achieved based on at least one time stamp included in each picture sequence.

A user may select one of the pictures of one of the views as a static part of a cinemagraph. The user could also wish to change the view of the static part during the cinemagraph. In this case, pictures captured by at least two cameras A, B, C could be selected for the static part. In addition, the duration for which a respective picture is to be used has to be defined. The duration could be defined in terms of a number of frames of the cinemagraph.

Furthermore, a user may select at least one of the highlighted elements for an animated part of the cinemagraph. The element can be selected from the same view as a picture that was selected for the static part or from a different view. The user could also wish to change the view of the animated element during the cinemagraph. In this case, the element could be selected in pictures of at least two views. In addition, the duration for which a respective view is to be used has to be defined. The duration could be defined by selecting the element in a number of pictures of a particular view.

A possible change of view for the static part and a possible change of view for the animated part can but do not have to coincide. That is, the change of viewpoint may be synchronous or asynchronous between the static part and the animated part or parts.

The user selection of static and animated parts is detected. (action 414)

Next, the image data that has been selected is aligned. (action 415) The alignment can be performed automatically or based on a user input.

A cinemagraph may then be created in a conventional manner using the selected picture or pictures for the static part and the selected element or elements in one or more views for the animated part. (action 416) The cinemagraph may be composed of a number of frames that are to be presented in a loop.

The data for the cinemagraph may be assembled in a file. The file may be provided for display on touchscreen 306 and/or for storage in memory 304 or in any other storage medium and/or for transmission to devices 320 and 340 or to any other device. (action 417) The created cinemagraph file may be in a conventional raster format, like an animated graphics interchange format (GIF) file format. It is to be understood, however, that other formats, like vector formats, could also be used in certain embodiments.

Figure 4:
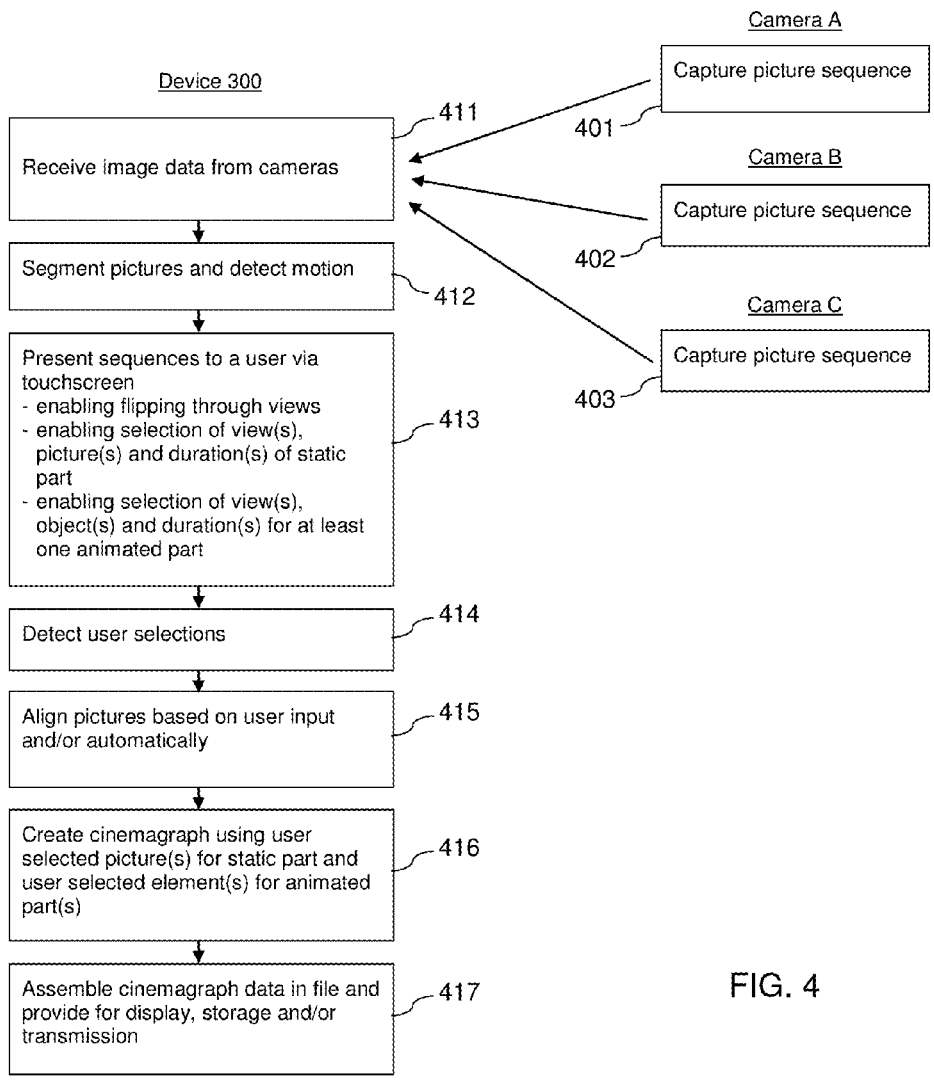
FIG. 4 is a flow chart illustrating an example operation in the system of FIG. 3.

It is to be understood that the operation presented in FIG. 4 could be modified in many ways and that the order of actions could be changed. For example, device 300 could also retrieve the image data captured by cameras B and C from a server in action 411. Furthermore, it would be possible to perform an automatic alignment of image data based on information on relative positions and orientations of the cameras in action 415. It would also be possible to perform the alignment before the user selection in action 413 for pictures of all received picture sequences. This may facilitate the selection for the user in action 413. On the other hand, the required processing power and/or the required user effort may be reduced, if the alignment is only performed for selected image data.

Figure 5:
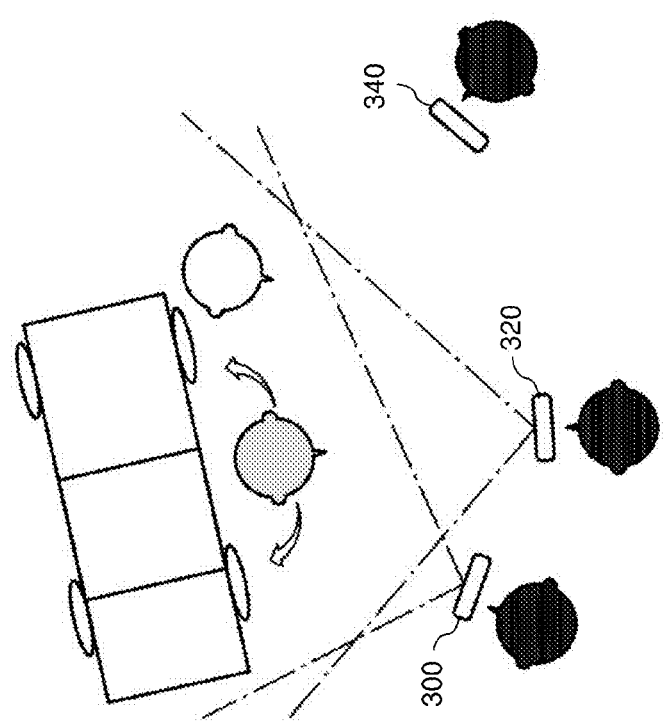
FIG. 5 is a schematic diagram of an example use case for the system of FIG. 3.

FIG. 5 presents an example use case for the operation illustrated in FIG. 4.

A user of mobile device 300, a user of mobile device 320 and user of mobile device 340 are watching a scene in which two people are dancing in front of a car. They decide to create a cinemagraph. Each of the users captures the scene using his/her device 300, 320, 340 with a respective different view in line with actions 401 to 403. They decide that the dancer on the right-hand side is to remain static and that the dancer on the left hand side is to be animated in the cinemagraph. For purposes of illustration, arrows are associated in FIG. 5 with this dancer on the left hand side. The users find one of the pictures captured by device 300 to be well suited as a static background. However, they think that the picture sequence captured by device 320 better depicts the dance moves than the picture sequence captured by camera 300. The image data captured by device 320 is therefore transferred to device 300 in line with action 411. Alternatively, the image data captured by device 320 and device 340 could be transferred to device 300 right away. The entire selection could then take place at device 300 in the scope of action 413. At device 300, the selected picture of the picture sequence captured by device 300 is combined with selected image data representing the dancer in the picture sequence captured by device 320 to obtain a collaborative cinemagraph in line with actions 412 to 417. In the alignment operation of action 415, the selected picture captured by device 300 could be scaled for example such that the dancer on the left hand side has the same size as in a picture of the picture sequence captured by device 320 at substantially the same instant of time. In addition, the image data in the selected picture captured by device 300 could be shifted such that the dancer on the left hand side has the same position as in the picture captured by device 320 at substantially the same instant of time. The image data from the picture sequence captured by device 320 that is used for creating the animation of the dancer could keep its original size so that forward and backward movements of the dancer are reflected in the cinemagraph.

It is to be understood that the image data of several mobile devices 300, 320, 340 could also be collected at a device that does not contribute to the image data of the cinemagraph, including a stationary device like a personal computer, for creating a collaborative cinemagraph.

Figure 6:
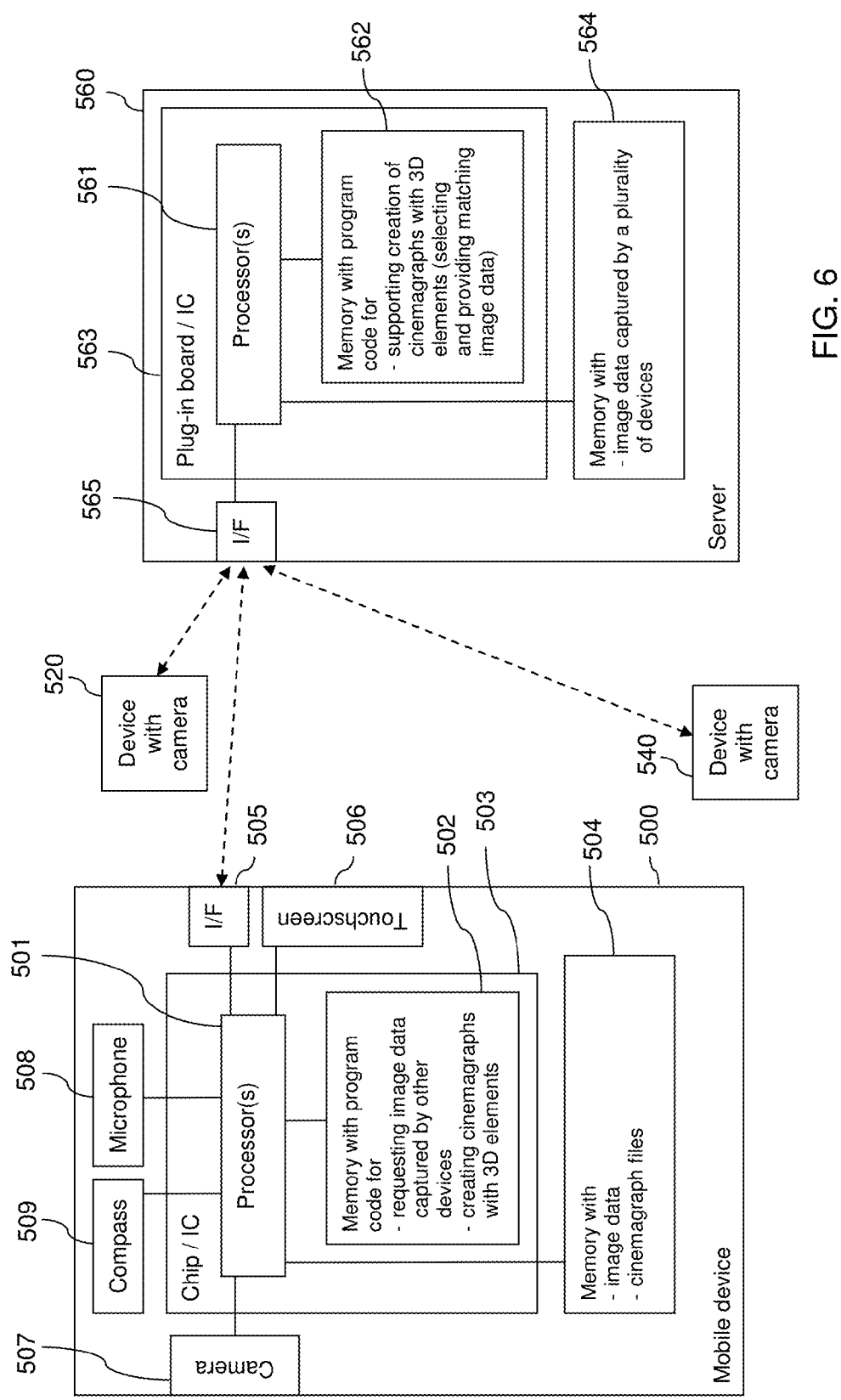
FIG. 6 is a schematic block diagram of another example embodiment of a system.

FIG. 6 is a schematic block diagram of another example embodiment of a system, which comprises a plurality of mobile devices 500, 520, 540 and a server 560.

Mobile device 500 could be for example again a camera, a mobile phone like a smartphone, some other mobile terminal or a laptop, etc. Mobile device 500 comprises a processor 501, a first memory 502, a second memory 504, a data interface 505, a touchscreen 506 and a camera 507, which may be configured and arranged in a similar manner as corresponding components of mobile device 300 of FIG. 3. In this case, however, memory 502 stores computer program code for creating cinemagraphs including rotating three-dimensional (3D) elements. The computer program code may be an example embodiment of the computer program code according to the first aspect of the invention. In addition, memory 502 may store computer program code implemented to realize other functions, for example communicating with a server, as well as any kind of other data. Processor 501 of mobile device 500 is moreover linked to a microphone 508 and to a digital compass 509. Processor 501 and memory 502 may optionally belong again to a chip or an integrated circuit 503. Mobile device 500 or module 503 could be an example embodiment of any apparatus according to the first aspect of the invention.

Mobile devices 520 and 540 could be similar to mobile device 500. It is to be understood, however, that they do not have to comprise computer program code for creating cinemagraphs.

Server 560 comprises at least one processor 561 and, linked to processor 561, a first memory 562, a second memory 564 and a data interface 656.

Processor 561 is configured to execute computer program code, including computer program code stored in memory 562, in order to cause server 560 to perform desired actions.

Memory 562 stores computer program code for selecting matching image data in order to support a creation of cinemagraphs based on image data captured by several devices. The computer program code may be an example embodiment of computer program code according to the second aspect of the invention and memory 562 may be an example computer readable medium according to the second aspect of the invention. In addition, memory 562 may store computer program code implemented to realize other functions as well as any kind of other data.

Processor 561 and memory 562 may optionally belong to a plug-in board or an integrated circuit 563, which may comprise in addition various other components, for instance a further processor or memory.

Memory 564 can equally be accessed by processor 561. It is configured to store any kind of data, for instance image data captured by cameras of various mobile devices. It could be an integrated part of server 560, but it could also be external to server 560.

Data interface 565 enables a data exchange with other devices via a direct and/or indirect connection, for instance via the Internet.

Server 560 or module 563 could be an example embodiment of any apparatus according to the second aspect of the invention. It is to be understood that it may be implemented and refined in various ways.

Example operations in the system of FIG. 6 will now be described with reference to FIG. 7. Processor 501 and some of the program code stored in memory 502 cause mobile device 500 to perform the operations presented on the left hand side of FIG. 7 when the program code is retrieved from memory 502 and executed by processor 501. These operations could represent an exemplary embodiment of a method according to the first aspect of the invention. Any presented data exchange of device 500 with other devices may be performed via data interface 505. Processor 561 and some of the program code stored in memory 562 cause server 560 to perform the operations presented on the right hand side of FIG. 7 when the program code is retrieved from memory 562 and executed by processor 561. These operations could represent an exemplary embodiment of a method according to the second aspect of the invention. Any presented data exchange of server 560 with other devices may be performed via data interface 565.

Camera 507 of mobile device 500 may capture a picture sequence upon a user request. At the same time, measurement data of microphone 508 and compass 509 may be read. The image data, an associated time stamp and the measurement data is received by processor 501. (action 601) The received data may be transmitted to server 560 for storage.

Server 560 receives image data of picture sequences, associated time stamps and associated measurement data from several devices, including for example devices 500, 520 and 540. A picture sequence may also be a sequence of frames of a video. Server 560 stores the data in memory 564. (action 602) Each set of received data may be stored for instance in a particular folder that is provided for a particular user or for a particular group of users.

When the user of device 500 wishes to create a cinemagraph, he may access and retrieve his/her own image data of a particular picture sequence stored by server 560 using a cinemagraph application. (action 603)

Based on the image data, device 500 determines candidate elements for an animation of a cinemagraph. The picture sequence may then be presented to the user on touchscreen 506, with the candidate elements highlighted for example by coloring. A user may be enabled to select one or more of the candidate elements. (action 604)

The user selection is detected. An indication of the selected elements is created and transferred to server 560. (action 605) The indication could define for instance the position of the selected element in a picture.

Server 560 receives the indication and searches for other picture sequences, which contain the indicated elements. (action 606)

The search may be limited to a particular folder associated to the user of device 500 or to all folders of users who enabled access to the user of device 500. The search may further be limited to picture sequences that have been captured at roughly the same time. The time could be determined for instance based on a time stamp associated to each picture or each picture sequence. From among these picture sequences, suitable picture sequences are selected, which are assumed to contain image data for the selected elements. This can be achieved by determining a relative position of devices that captured the stored picture sequences based on associated stored measurement data output by a microphone of each device, and by determining a relative orientation of devices that captured the stored picture sequences based on associated stored measurement data output by a compass of each device. In addition, the position of the selected elements in a picture captured by device 500 can be considered.

It has to be noted that the search could further be limited in advance to picture sequences that have been captured at roughly the same location. The rough location could be determined for instance based on an indication of a GPS based location of the devices when taking the picture sequences.

If the search results in the assumption that certain picture sequences contain image data for at least one selected element, an indication of this element or these elements is generated and transmitted to device 500. (action 607) The indication of an element may be for example the same as the indication received from device 500 for this element, or simply an ordinal number identifying the indication of this element among all indications provided in action 605. However, in case the search is configured such that it determines in addition whether available image data is suitable for at least one of a plurality of different purposes, the indication could also comprise in addition information on a type of the available image data. The information could be, for instance, information that the available image data is suitable for a presentation of an element as a rotating 3D element, information on a direction of a rotation that would be enabled with the available image data or information on a supported rotation axis. Another type of available image data that could be indicated might be for instance image data that enables a zooming in and out of an element, if the element has been captured by several cameras at different distances, but essentially from the same direction.

Device 500 highlights the indicated element or elements in the presentation on touchscreen 506 to show to the user that 3D material is available for this element or these elements. (action 608) The highlighting could optionally comprise an indication of a type of available 3D material. If generally only 3D material is determined in action 606 that enables a rotation around a vertical axis, any indicated element could be highlighted by means of arrows indicating the possibility of such a rotation. In case additional information is included in the indication received from server 560, the highlighting could be adapted specifically to the information to show to the user which type of motion is supported by the available data. In this case, the highlighting could be provided for example using at least one of different types of arrows.

Device 500 furthermore enables and detects a user request for 3D material for a highlighted element. (action 609)

When such a user request is detected, device 500 requests image data for the element from server 560. (action 610)

Server 560 receives the request. It selects specifically those pictures of the previously found picture sequences that can be assumed to contain image data for the element. Server 560 then extracts parts of the selected pictures that can be assumed to contain image data for the element. This information may be available from the search in action 606. Server 560 now streams the extracted image data to the requesting device 500. (action 611)

Device 500 receives the image data and may now present available views on a selected element to the user and enable the user to select different views. (action 612) This action could also be omitted by automatically accepting all available views.

Device 500 now enables a user input for selecting desired details of a cinemagraph, detects the user input and creates a cinemagraph based on the user input. (action 613) The creation of the cinemagraph may comprise an alignment of all used image data.

The cinemagraph may comprise a static part that is based on the image data of a selected picture of the picture sequence captured by camera 507 of device 500 and retrieved in action 603.

The cinemagraph may furthermore comprise animated parts selected by a user. The animated parts may comprise for instance animated 2D elements and/or a rotating 3D element. An animated 2D element may be based on image data of the picture sequence captured by camera 507 of device 500 and retrieved in action 603. A rotating 3D element may be based on image data of the picture sequence captured by camera 507 of device 500 and retrieved in action 603 and on image data of one or more picture sequences captured by cameras of other devices 520, 540 and streamed to device 500 in action 607. A rotating 3D element may optionally comprise two animated aspects; a first aspect may be the actual rotation. Such a rotation could be achieved with image data of different views captured at a single point in time. A second aspect may be the motion of the element over time that is captured in each of the picture sequences. A rotation taking account of the second aspect in addition could be achieved with image data of different views captured at subsequent points in time. The generation of the rotating 3D element may comprise a generation of a disparity map or depth map as a basis for aligning two views and filling the gap between them.

It has to be noted that the user could also be enabled to cause selected elements to change between being static and animated or between 2D animated and 3D animated during the loop of the final cinemagraph. The 3D effect may be used to further highlight certain animated elements or parts of animated elements.

The data of the cinemagraph is finally assembled in a file for storage, transmission and/or presentation. (action 614)

Figure 7:
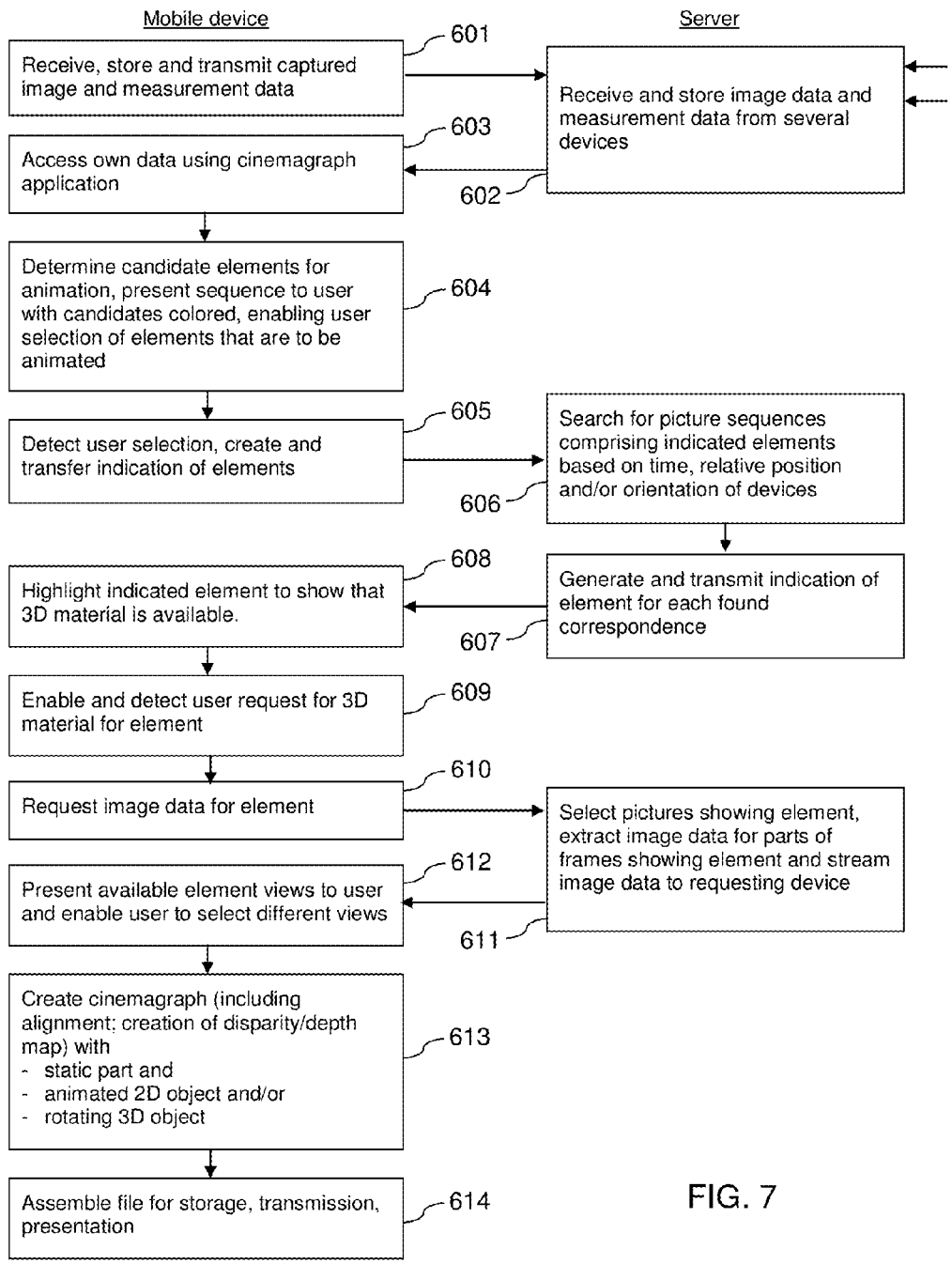
FIG. 7 is a flow chart illustrating an example operation in the system of FIG. 6.
Figure 9:
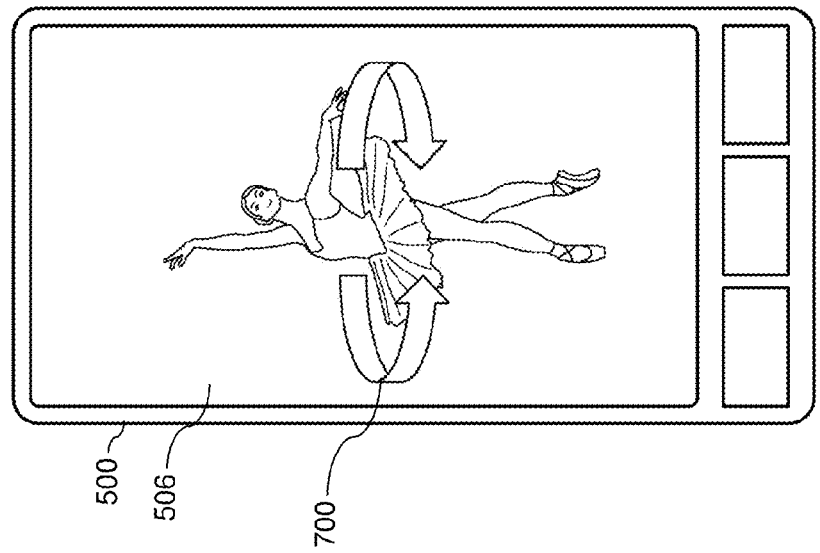
FIG. 9 is a schematic diagram of an example presentation to a user during the example use case of FIG. 8.
Figure 8:
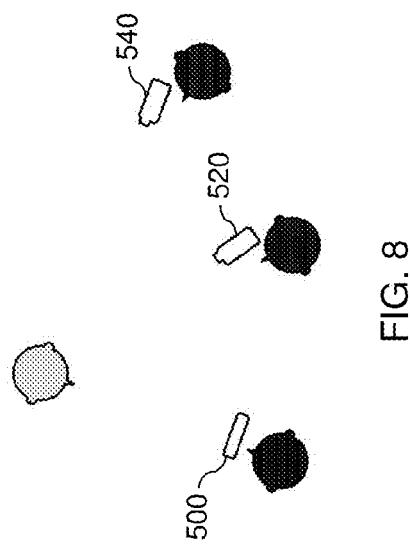
FIG. 8 is a schematic diagram of an example use case for the system of FIG. 6.
Figure 10:
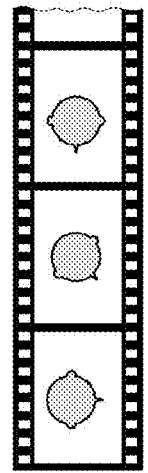
FIG. 10 is a schematic diagram illustrating available views in the example use case illustrated in FIG. 8.

FIGS. 8 to 10 present an example use case for the operation of FIG. 7.

Mobile devices 500, 520 and 540 of the system of FIG. 6 could belong for instance to three friends visiting a ballet. Device 500 could be for example a mobile phone with camera and devices 520 and 540 could be for example video cameras. Each of the friends may use his/her device 500, 520 and 540 for filming a dancer, as illustrated in FIG. 8 in a schematic topview on the scene. The captured content could be shared for instance to any suitable service, which may, for example, enable a user to upload data to a folder in a cloud storage using a browser and to allow access to the folder to selected other users.

A user of mobile device 500 may then start an editing process for a cinemagraph with action 603. With action 604, the dancer could automatically be determined to be a moving element, which could be indicated for example by showing the contour of the dancer in a noticeable color. With actions 604 to 608, the dancer may furthermore be automatically highlighted to indicate that 3D material of the dancer is available and that the dancer could therefore be animated by rotation. This is illustrated in FIG. 9. FIG. 9 is a schematic diagram of a mobile phone as an exemplary mobile device 500. An image of the dancer is presented on touchscreen 506 of mobile phone 500. Two arrows 700 that are equally presented on touchscreen 506 indicate the possibility of a rotation.

If the user wants to try the effect of such a rotation, he may select the dancer for a rotating 3D animation with action 609, for example by putting two fingers on top of the dancer and perform a rotating movement.

Device 500 recognizes this as a request to stream data required for a rotation in the cinemagraph and starts streaming the required frames of other available videos from the other two users from server 560 with action 610.

Server 560 may be configured to select frames or parts of frames in action 611 that are relevant for the requested rotation, and transmit the selected frames. For example, server 560 may select and transmit only those frames or parts of frames in action 611 that are relevant for the requested rotation. This selection of such parts can be based on the relative positions of the devices 500, 520, 540 and the action of the user. Therefore, it is not required to transmit the entire captured video files, which may save bandwidth considerably. The frames that server 560 provides may come from any participant, and any selected frame depends on the relative positions and capture directions of the devices that captured the frames.

The cameras of devices 500, 520 and 540 could capture the dancer for example at a particular single time instant as depicted in FIG. 8. FIG. 10 schematically presents three example frames that are available for that time instant (using a top view on the dancer, just for the purpose of illustration). A first frame comprises the view on the dancer captured by device 500 of the first user, the second frame comprises the view on the dancer captured by device 520 of the second user, and the third frame comprises the view on the dancer captured by device 540 of the third user. The frames show that it is possible to animate a rotation to the left of the dancer presented on the display in FIG. 9. It has to be noted that the selected frames are not necessarily time-synchronous.

The obtained data thus enables a 3D rendering of the dancer with actions 612 to 614. Action 613 could comprise for example an alignment which takes care that the feed from different angles is scaled to the same size at each time instant. The respective image data from one of the cameras 500, 520, 540 could be used as a reference. The end result may be a combination of a traditional cinemagraph where certain areas can be selected to be static, where certain areas can be selected to include movement and where an animated 3D element can be constructed of multi-user source material.

Certain embodiments of the invention may thus enable a multi-user contribution to cinemagraphs. Certain embodiments of the invention may further enable the integration of rotational 3D elements to cinemagraphs. Certain embodiments of the invention may further enable an on-demand streaming of image data, and thus avoid the need to download all content captured by other devices. Certain embodiments of the invention may further provide a complementary feature to existing cinemagraphs, which is easily adoptable and which can be, for instance, semi-automatic. Certain embodiments of the invention may require only a simple user interaction.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 11:
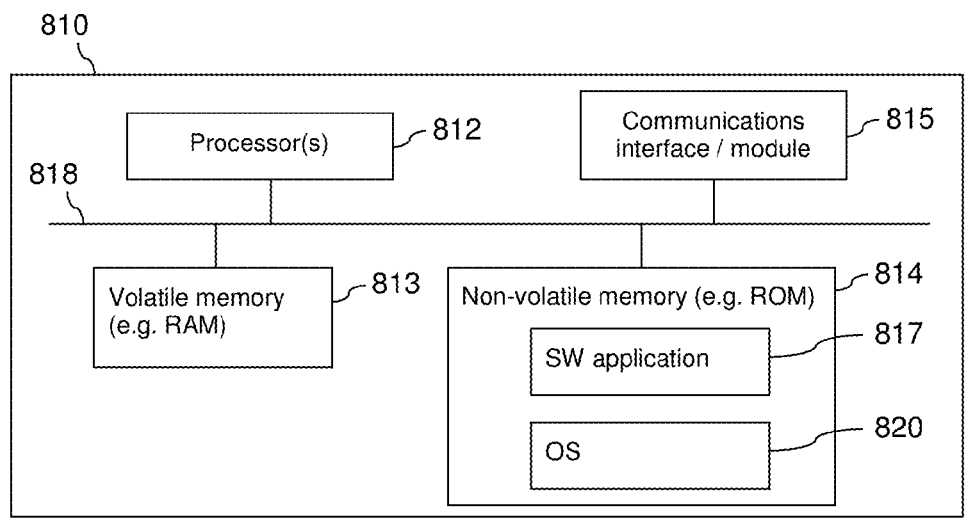
FIG. 11 is a schematic block diagram of an example embodiment of an apparatus.
Figure 12:
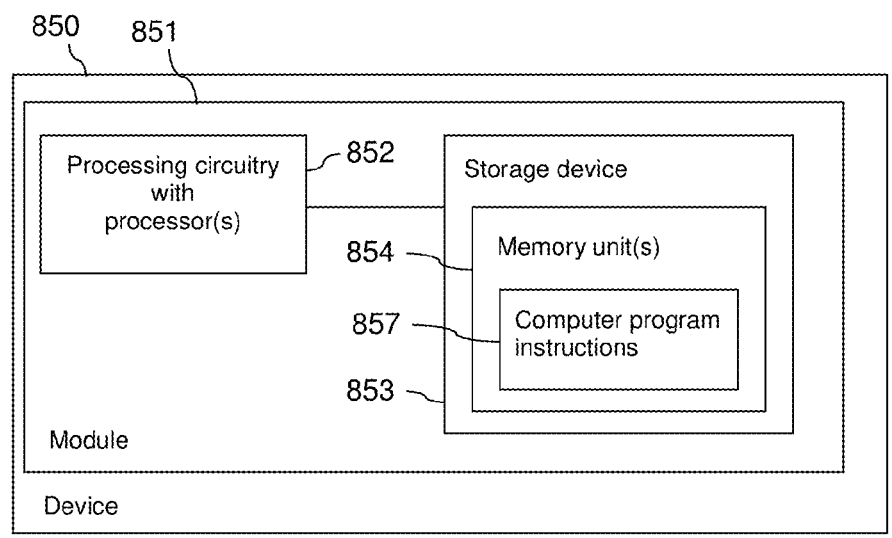
FIG. 12 is a schematic block diagram of an example embodiment of an apparatus.

Example embodiments using at least one processor and at least one memory as a non-transitory data medium are shown in FIGS. 11 and 12.

FIG. 11 is a schematic block diagram of a device 810. Device 810 includes a processor 812. Processor 812 is connected to a volatile memory 813, such as a RAM, by a bus 818. Bus 818 also connects processor 812 and RAM 813 to a non-volatile memory 814, such as a ROM. A communications interface or module 815 is coupled to bus 818, and thus also to processor 812 and memories 813, 814. Within ROM 814 is stored a software (SW) application 817. Software application 817 may be a navigation application, although it may take some other form as well. An operating system (OS) 820 also is stored in ROM 814.

FIG. 12 is a schematic block diagram of a device 850. Device 850 may take any suitable form. Generally speaking, device 850 may comprise processing circuitry 852, including one or more processors, and a storage device 853 comprising a single memory unit or a plurality of memory units 854. Storage device 853 may store computer program instructions that, when loaded into processing circuitry 852, control the operation of device 850. Generally speaking, also a module 851 of device 850 may comprise processing circuitry 852, including one or more processors, and storage device 853 comprising a single memory unit or a plurality of memory units 854. Storage device 853 may store computer program instructions that, when loaded into processing circuitry 852, control the operation of module 851.

The software application 817 of FIG. 11 and the computer program instructions 857 of FIG. 12, respectively, may correspond e.g. to the computer program code in memory 102, memory 302, memory 502 or memory 562.

Figure 13:
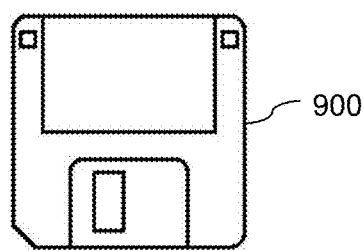
FIG. 13 schematically illustrates example removable storage devices.
Figure 13:
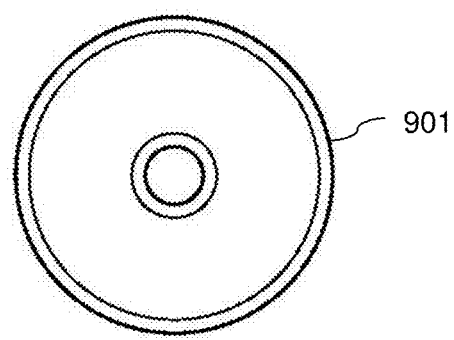
Figure 13:
Figure 13:
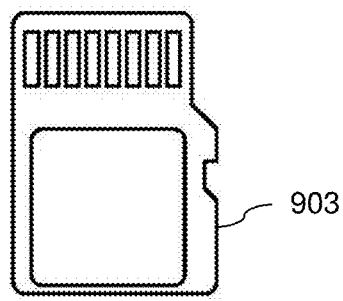

In example embodiments, any non-transitory computer readable medium mentioned in this text could also be a removable/portable storage or a part of a removable/portable storage instead of an integrated storage. Example embodiments of such a removable storage are illustrated in FIG. 13, which presents, from top to bottom, schematic diagrams of a magnetic disc storage 900, of an optical disc storage 901, of a semiconductor memory circuit device storage 902 and of a Micro-SD semiconductor memory card storage 903.

The functions illustrated by processor 101 in combination with memory 102, by processor 301 in combination with memory 302, by processor 501 in combination with memory 502, by module 303 or by module 503 can also be viewed as means for receiving first image data that is based on image data captured by a first camera; means for receiving second image data that is based on image data captured by a second camera; and means for creating a cinemagraph using the first image data for a static part of the cinemagraph and using the second image data for an animated part of the cinemagraph.

The program codes in memories 102, 302 and 502 can also be viewed as comprising such means in the form of functional modules.

The functions illustrated by processor 561 in combination with memory 562 or by module 563 can also be viewed as means for receiving image data captured by a first camera; means for receiving image data captured by a second camera; means for comparing the received image data captured by the first camera and the received image data captured by the second camera to determine corresponding elements represented by the received image data captured by the first camera and the received image data captured by the second camera; means for providing an indication to a device in the case of a determined corresponding element, the indication enabling the device to highlight the element in a presentation of first image data that is based on image data captured by the first camera; means for receiving from the device a request for second image data that is based on image data captured by the second camera; and means for providing the second image data to the device to enable the device to create a cinemagraph using the first image data and the second image data.

The program code in memory 562 can also be viewed as comprising such means in the form of functional modules.

FIGS. 2, 4 and 7 may also be understood to represent example functional blocks of computer program codes supporting a creation of cinemagraph.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. An apparatus comprising at least one processor and at least one memory including computer program code, the at least one memory and the computer program code configured to, with the at least one processor, cause at least one apparatus at least to perform:
   receipt of first image data that is based on image data captured by a first camera;
   receipt of second image data that is based on image data captured by a second camera; and
   creation of a cinemagraph using the first image data for a static part of the cinemagraph and using the second image data for an animated part of the cinemagraph, wherein the creation of the cinemagraph comprises aligning the received first image data and the received second image data based on information on relative positions and orientations of the first camera and the second camera.

2. The apparatus of claim 1, wherein the received first image data and the received second image data are selected for creating the cinemagraph based on at least one of computed relative positions of the first camera and the second camera, computed relative orientations of the first camera and the second camera, or a user input.

3. The apparatus of claim 1, wherein the at least one memory includes computer program code configured to, with the at least one processor, cause the apparatus to at least perform enablement of a user to select image data that is to be used for a static part when creating the cinemagraph and image data that is to be used for an animated part of the cinemagraph when creating the cinemagraph.

4. The apparatus of claim 1, wherein the creation of the cinemagraph comprises creation of, as an animated part, a rotating three-dimensional element.

5. The apparatus of claim 1, wherein the at least one memory includes computer program code configured to, with the at least one processor, cause the apparatus to at least perform, before the second image data is received and the cinemagraph is created:
   presentation of the received first image data to a user;
   receipt of an indication that second image data for an element in the received first image data is available;
   highlighting of an element in the presented first image data for which second image data is available;
   requesting of the second image data upon a user input; and
   receipt of the second image data in response to the request.

6. The apparatus of claim 5, wherein the received second image data is based on a subset of image data captured by the second camera, the subset being selected based on at least one of the indication of the element and a user selection of an element.

7. The apparatus of claim 1, wherein the at least one memory includes computer program code configured to, with the at least one processor, cause the apparatus to at least perform, before the cinemagraph is created:
   comparison of the first image data and the second image data to determine corresponding elements represented by the first image data and the second image data;
   providing of an indication for transmission to a device in the case of a determined corresponding element, the indication enabling the device to highlight the element in a presentation of the first image data;
   receipt from the device of a request for the second image data; and
   providing of the second image data for transmission to the device to enable the device to create the cinemagraph using the first image data and the second image data.

8. The apparatus of claim 7, wherein the first image data is received with information on at least one of a position and an orientation of the first camera, the second image data is received with information on at least one of a position and an orientation of the second camera, and wherein comparing the first image data and the second image data comprises selecting parts of the first image data and the second image data for the comparison based on the information.

9. The apparatus of claim 7, wherein creation of the cinemagraph comprises scaling the corresponding elements represented by the first image data and the second image data to a same size.

10. A method comprising:
    receiving first image data that is based on image data captured by a first camera;
    receiving second image data that is based on image data captured by a second camera; and
    creating a cinemagraph using the first image data for a static part of the cinemagraph and using the second image data for an animated part of the cinemagraph, wherein the creation of the cinemagraph comprises aligning the received first image data and the received second image data based on information on relative positions and orientations of the first camera and the second camera.

11. The method of claim 10, wherein the received first image data and the received second image data are selected for creating the cinemagraph based on at least one of computed relative positions of the first camera and the second camera, computed relative orientations of the first camera and the second camera, or a user input.

12. The method of claim 10, further comprising, before the second image data is received and the cinemagraph is created:
    presenting the received first image data to a user;
    receiving an indication that second image data for an element in the received first image data is available;
    highlighting an element in the presented first image data for which second image data is available;
    requesting the second image data upon a user input; and
    receiving the second image data in response to the request.

13. The method of claim 12, wherein the received second image data is based on a subset of image data captured by the second camera, the subset being selected based on at least one of the indication of the element and a user selection of an element.

14. The method of claim 10, further comprising, before the cinemagraph is created:
    comparison of the first image data and the second image data to determine corresponding elements represented by the first image data and the second image data;
    providing of an indication for transmission to a device in the case of a determined corresponding element, the indication enabling the device to highlight the element in a presentation of the first image data;
    receipt from the device of a request for the second image data; and
    providing of the second image data for transmission to the device to enable the device to create the cinemagraph using the first image data and the second image data.

15. The method of claim 14, wherein the first image data is received with information on at least one of a position and an orientation of the first camera, the second image data is received with information on at least one of a position and an orientation of the second camera, and wherein comparing the first image data and the second image data comprises selecting parts of the first image data and the second image data for the comparison based on the information.

16. The method of claim 14, wherein creation of the cinemagraph comprises scaling the corresponding elements represented by the first image data and the second image data to a same size.

17. A non-transitory computer readable medium, the computer readable medium storing computer program code, the computer code comprising computer program instructions for:
  receipt of first image data that is based on image data captured by a first camera;
  receipt of second image data that is based on image data captured by a second camera; and
  creation of a cinemagraph using the first image data for a static part of the cinemagraph and using the second image data for an animated part of the cinemagraph, wherein the creation of the cinemagraph comprises aligning the received first image data and the received second image data.

18. The computer readable medium of claim 17, wherein the received first image data and the received second image data are selected for creating the cinemagraph based on at least one of computed relative positions of the first camera and the second camera, computed relative orientations of the first camera and the second camera, or a user input.

19. The computer readable medium of claim 17, wherein the computer code further comprises computer program instructions for, before the second image data is received and the cinemagraph is created:
  presentation of the received first image data to a user;
  receipt of an indication that second image data for an element in the received first image data is available;
  highlighting of an element in the presented first image data for which second image data is available;
  requesting of the second image data upon a user input; and
  receipt of the second image data in response to the request.

20. The computer readable medium of claim 17 wherein the computer code further comprises computer program instructions for:
  comparing the first image data and the second image data to determine corresponding elements represented by the first image data and the second image data;
  providing of an indication for transmission to a device in the case of a determined corresponding element, the indication enabling the device to highlight the element in a presentation of the first image data;
  receipt from the device of a request for the second image data; and
  providing of the second image data for transmission to the device to enable the device to create the cinemagraph using the first image data and the second image data.

* * * * *